United States Patent Office 3,112,298
Patented Nov. 26, 1963

3,112,298
ORGANOBORON POLYMERIZATION
CATALYSTS
Frank J. Welch, Charleston, W. Va., assignor to Union Carbide Corporation, a corporation of New York
No Drawing. Filed Feb. 4, 1960, Ser. No. 6,609
17 Claims. (Cl. 260—92.1)

The present invention relates to the polymerization of ethylenically unsaturated monomers. More particularly, this invention relates to a novel catalytic process for the polymerization of certain ethylenically unsaturated monomers, and is concerned further with the production of novel polymers of vinyl fluoride.

Heretofore, it has been known that the polymerization of vinyl monomers, such as vinyl chloride, ethylene and the like, can be catalyzed by contact with the free radicals produced by the thermal decomposition of substances such as peroxides and azo compounds. In general, however, when these free radical-producing compounds are employed, it is essential to carry out the polymerization reactions at above ambient temperature so that the thermal decomposition required for the production of the free radicals will take place to an appreciable extent. Thus, the operating conditions under which the free radical catalyzed polymerizations can be carried out on a commercial basis are considerably limited. Another disadvantage particularly attending the use in polymerization reactions of peroxide-type free radical-producing compounds, such as benzoyl peroxide, hydrogen peroxide, lauroyl peroxide and the like, lies in the fact that these peroxides, or their residues, may oxidize the polymeric product that is formed, thereby resulting in the discoloration of the polymer as well as engendering other deleterious changes in the properties of the polymer. Such compounds may also alter the color of many dyestuffs commonly added to the reaction mixture after polymerization. It has also been found that many of the free radical-producing compounds are, unfortunately, highly unstable and are necessarily stored at very low temperatures prior to use or prepared in situ; still others are sensitive to shock and therefore require considerable care in handling.

In addition to the free radical-producing compounds hereinabove described, many other catalysts presently employed in the polymerization of vinyl monomers, such as metal alkyls and mixtures containing metal alkyls in combination with metal halides, engender the formation of polymeric products containing difficultly removable residues. The presence of such residues often presents the direct utilization of the polymeric products in many applications, as for instance, in the production of films or fibers.

The aforementioned disadvantages of the prior art can now be overcome to a substantial extent through the practice of the present invention, whereby one or more of the following objects can be achieved.

It is a principal object of this invention to provide a novel catalytic process for the polymerization of ethylenically unsaturated monomers. It is another object of this invention to provide novel catalysts for the polymerization of ethylenically unsaturated monomers which are operable even at temperatures substantially below room temperature. A further object of this invention is to provide polymers of ethylenically unsaturated monomers having improved physical properties and which are essentially devoid of objectionable residues. Still other objects will appear in connection with the following description.

In its broadest aspect, the present invention depends upon the discovery that certain monomers containing at least one non-aromatic ethylenically unsaturated group can be polymerized by contacting the monomer under polymerizing conditions, as hereinbelow described, with a catalytic quantity of an organoboron compound having the general formula:

wherein X designates a member of the class consisting of the

and —$R_2$ radicals, and R, $R_1$, $R_2$ and $R_3$ each designates a monovalent hydrocarbon radical, as for instance, an aliphatic radical, and particularly an alkyl radical, preferably containing from 2 to about 12 carbon atoms; a cycloaliphatic radical, and particularly a cycloalkyl radical, preferably containing from 3 to about 12 carbon atoms; or an aromatic hydrocarbon radical, and particularly a monocyclic aryl or aralkyl radical, preferably containing from 6 to about 12 atoms. Illustrative of the monovalent hydrocarbon radicals designated above by R, $R_1$, $R_2$ and $R_3$ are methyl, ethyl, isopropyl, butyl, butenyl, neopentyl, 2-ethylhexyl, decyl, dodecyl, methylcyclopentyl, cyclopentyl, cyclohexyl, cyclohexenyl, ethylcyclohexyl, phenyl, benzyl radicals and the like. It is to be noted in this connection that hereinafter, unless otherwise explicitly indicated, the term "aliphatic radical" is intended to include acyclic aliphatic radicals as well as cycloaliphatic radicals. Similarly, the term "alkyl radical" is intended to include acyclic alkyl radicals as well as cycloalkyl radicals.

Among the organoboron compounds which are suitable for use as polymerization catalysts in the process of this invention there can be mentioned the following: trimethylboron, triethylboron, tri-n-butylboron, tri-n-butenylboron, di-n-butylboronous anhydride, n-butyl di-n-butylboronite, triisobutylboron, tri-2-ethylhexylboron, tridodecylboron, tricyclopentylboron, tricyclohexylboron, tricyclohexenylboron, triphenylboron, tribenzylboron and the like. The more preferred catalysts of this invention are the trialkylboron compounds possessing alkyl radicals each containing from 2 to about 12 carbon atoms, of which tri-n-butylboron is especially preferred. The organoboron compounds of this invention containing as the monovalent hydrocarbon radical constituents thereof one or more aromatic hydrocarbon radicals, such as triphenylboron or tribenzylboron, are generally less preferred as catalysts in the process of this invention due to the lower ratio of polymerization, i.e. conversions of monomer to polymer, that they may engender. Such catalysts are therefore usually limited to use with the more readily reactive monomers, such as acrylic acid, acrylamides or acrylic acid esters.

The broad range of ethylenically unsaturated monomers contemplated by this invention can be defined more clearly as the compounds having the general formula:

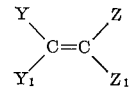

wherein Y and $Y_1$ each designates either a hydrogen or a halogen atom, Z designates a member of the class consisting of hydrogen and halogen atoms and the alkyl radicals preferably containing from 1 to about 4 carbon atoms, of which methyl and ethyl radicals are especially preferred, and $Z_1$ designates a substituent, i.e. an atom or radical, characterized by having a zero or a positive para-sigma value as defined by Hammett (Physical Organic Chemistry, McGraw-Hill Book Co., 1940, pp. 184–188). As so defined, the para-sigma value of a substituent can be obtained from the equation:

$$\text{para-sigma value } (\sigma) = \log K_i - \log K_i°$$

wherein $K_i$ designates the ionization constant of the benzoic acid derivative containing the substituent in the para-position of the benzoic acid molecule, and $K_i°$ designates the ionization constant of unsubstituted benzoic acid.

It has been found that the greater the para-sigma value of the substituent designated above by $Z_1$, other factors being constant, the more readily will the ethylenically unsaturated monomer be polymerized by contact with the organoboron catalysts of this invention. Accordingly, the ethylenically unsaturated monomers contemplated by this invention can possess a substituent designated by $Z_1$ having a para-sigma value in the range of from 0 to about +1.3, or even higher. Illustrative of the substituents which have a zero, or positive para-sigma value, to mention but a few, are —H, -halogen —$C_6H_5$, —CN, —COOH, —COOR', —CONH$_2$, —CONR'$_2$, —OCOR', —COR' and —SOOR', wherein R' designates an alkyl, alkoxyalkyl, cyanoalkyl or haloalkyl radical, preferably containing from 1 to about 18 carbon atoms, or slightly higher. Among the substituents which, on the other hand, do not have a positive or zero para-sigma value are the alkyl and alkoxy radicals. It has also been found of critical importance to this invention that the substituent designated by $Z_1$ have a positive para-sigma value of at least about 0.4 when Z designates an alkyl radical, other ethylenically unsaturated monomers ordinarily being inoperable in the process of this invention. Thus, when Z designates an alkyl radical, $Z_1$ can be —CN, —COOH, —COOR', —CONH$_2$, —CONR'$_2$, —COR' or —SOOR' etc., wherein R' is as defined above. Illustrative of the substituents having a zero para-sigma value or a positive para-sigma value of less than about 0.4, and therefore excluded from the substituents designated by $Z_1$ when Z designates an alkyl radical, are hydrogen and halogen atoms and the phenyl (—$C_6H_5$) radical.

As typical of the ethylenically unsuarted monomers which can be polymerized in accordance with the process of this invention there can be mentioned the following: ethylene; acrylyl and alkylacrylyl compounds, particularly acrylic, haloacrylic and methacrylic acids and esters, and acrylyl and alkylacrylyl nitriles and amides, such as alpha-chloroacrylic acid, ethyl acrylate, cyanoethyl acrylate, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, chloroethyl methacrylate, acrylonitrile, methacrylamide, acrylamide, N,N-diethylacrylamide, diethylaminopropyl acrylamide, N-methoxymethyl acrylamide and the like; vinyl and vinylidene halides, such as vinyl chloride, vinyl fluoride, vinylidene chloride, vinylidene fluoride, 1-fluoro-1-chloroethylene and the like; haloethylenes, such as chlorotrifluoroethylene, 1,1-dichloro-2,2-difluoroethylene and the like; vinyl esters of alkyl or haloalkyl carboxylic acids, such as vinyl acetate, vinyl chloroacetate, vinyl propionate, vinyl trimethylacetate, vinyl hexanoate, vinyl laurate, vinyl stearate and the like; N-vinyl imides, such as N-vinylphthalimide, N-vinylsuccinimide and the like; N-vinyllactams, such as N-vinylcaprolactam, N-vinylbutyrolactam and the like; vinyl aryls, such as styrene, vinylnaphthalene and the like; other vinyl derivatives, such as methyl vinyl ketone, vinylpyridine, methyl vinyl sulfone and the like, etc. The ethylenically unsaturated monomers of this invention also include those compounds having a plurality of polymerizable ethylenic double bonds which are isolated with respect to each other, such as divinyl succinate, divinyl adipate, divinyl benzene and the like. Also contemplated in this connection are compounds having one or more of the isolated ethylenic groups conjugated with a carboxylic group, such as vinyl acrylate, vinyl methacrylate, methacrylic anhydride, acrylic and substituted acrylic esters of polyhydric alcohols, such as ethylene glycol dimethacrylate, diethylene glycol dimethacrylate, triethylene glycol dimethacrylate, tetraethylene glycol dimethacrylate, diethylene glycol diacrylate, decamethylene glycol diacrylate, glyceryl triacrylate, polyethylene glycol dimethacrylates and the like. Of the ethylenically unsaturated monomers mentioned above, ethylene, the haloethylenes, the vinyl and vinylidene halides, the vinyl aryls, the acrylic, haloacrylic and methacrylic acids and esters, the acrylyl and methacrylyl nitriles and amides and the vinyl esters of alkyl and haloalkyl carboxylic acids represent preferred monomers due to their ease of polymerization.

In addition, it is to be noted that monomeric mixtures containing two or more of the above-mentioned ethylenically unsaturated monomers can also be employed in accordance with this invention when a copolymeric product is desired. For example, among the copolymers that can be obtained when the process of this invention is employed using mixtures of the ethylenically unsaturated monomers there can be mentioned the copolymers of vinyl chloride with ethylene, cyanoethyl acrylate, vinyl acetate, acrylonitrile, vinyl stearate, vinylidene chloride, vinyl fluoride or methyl methacrylate; the copolymers of vinyl acetate with decyl acrylate, acrylonitrile, vinylidene chloride or methylmethacrylate; the copolymers of butyl acrylate with acrylamide, acrylonitrile or vinyl stearate; the copolymers of acrylamide with diethylaminopropyl acrylamide; the copolymers of methacrylic acid with ethylene glycol dimethacrylate; the copolymers of styrene with acrylonitrile and the like.

The function of the organoboron compounds herein described being that of a catalyst, any catalytic amount thereof can be used in accordance with this invention. Most frequently, however, the organoboron catalyst is employed in a concentration of from about 0.03 percent to about 5 percent by weight based upon the weight of the ethylenically unsaturated monomer(s) present in the polymerization mixture, with the use of a catalyst concentration of from about 0.1 percent to about 3 percent by weight based on the weight of the ethylenically unsaturated monomer(s) being preferred. Somewhat lower catalyst concentrations can also be employed effectively, while the upper limit of catalyst concentration is merely one of economic consideration.

The process of this invention is generally carried out at a temperature in the range of from about —120° C., and preferably from about —80° C., to about 150° C. The optimum temperature for a particular polymerization, however, may vary within the broad range of from about —120° C. to about 250° C. depending upon the ethylenically unsaturated monomer(s) employed. Somewhat higher or lower polymerization temperatures can also be used. Thus, for example, acrylic acid, acrylamide and acrylate esters, such as ethyl acrylate, polymerize readily at a temperature in the range of from about —120° C. to about 70° C. Acrylonitrile, vinyl chloride and vinyl esters of alkyl or haloalkyl carboxylic acids, such as vinyl acetate, however, only polymerize slowly at a temperature of about —80° C., the optimum temperature for the rapid polymerization of such monomers being in the range of from about —30° C. to about 50° C., and preferably no higher than 70° C., since at the higher temperature, the conversion rate of monomer to polymer is markedly reduced. Likewise, the optimum temperature range for the polymerization of methacrylic acid, methacrylamide and methacrylate esters, such as methyl methacrylate, extends from about —30° C. to about 70° C. Styrene and vinylidene chloride polymerize best at a temperature above —10° C., but preferably not higher than about 100° C., since at such higher temperatures, the undesirable thermal polymerization of the monomers takes place to an appreciable extent. On the other hand, a reaction temperature of from about 0° C. to about 250° C. is eminently suitable for the polymerization of ethylene.

The reaction period and pressure can also be varied broadly in accordance with the process of this invention. Thus, superatmospheric, subatmospheric or atmospheric pressures can be employed with good results so long as there is a sufficient concentration of monomer present. The polymerization can most conveniently be conducted at the autogenous pressures created in the reaction equipment that is employed, up to pressures of from about 50 atmospheres to about 3000 atmospheres, and can be conducted in a continuous manner in an agitator-equipped vessel at atmospheric pressure or at an elevated pressure in a tubular reactor such as that conventionally employed for the polymerization of ethylene. Alternatively, the polymerization can be conducted batchwise in a sealed autoclave or in any other convenient manner. The reaction period can vary from as little as five minutes or less, up to several days if desired. The longer the reaction period, of course, the more complete the polymerization.

In addition, the process of this invention can be carried out by bulk, suspension, emulsion or solution methods of polymerization, i.e. with or without a diluent. When a diluent is employed, it must be inert, i.e. non-reactive with the other materials present, and can serve as a solvent or simply as a suspending medium for either the catalyst, the reactant monomer(s) or the polymeric product. By way of illustration, the polymerization can be carried out in water in the presence of suspending or emulsifying agents, such as esters of sulfonated dicarboxylic acids, e.g. dioctyl sodium sulfosuccinate (Aerosol OT) etc. Other inert organic diluents which can be used include alcohols, ketones, saturated aliphatic and aromatic hydrocarbons, ethers, alkyl and aryl halides, nitriles, amides, esters, and the like. As typical of the suitable organic diluents there can be mentioned the following: methanol, acetone, heptane, toluene, benzene, diethyl ether, tetrahydrofuran, propylene oxide, ethylene dichloride, chlorobenzene, acetonitrile, dimethylformamide, ethyl acetate and the like. Amines which do not form stable complexes with the organoboron catalyst of this invention at the temperature at which the polymerization is conducted can also be employed as diluents. However, as noted previously it is not necessary that a diluent be present. The polymerization of vinyl chloride, for example, can be carried out in bulk or as a suspension or slurry in heptane. Thus, it will be apparent that the amount of diluent employed can also be varied broadly in accordance with this invention. In general, however, it is desirable to have at least 1 percent by weight of monomer present in the diluent, when the latter is employed, although this restriction is again one of economic consideration.

Since the organoboron catalysts of this invention tend to react with oxygen, it is desirable although not essential, to conduct the polymerization in a substantially oxygen-free atmosphere. Thus, air is usually excluded by maintaining an inert atmosphere (e.g., nitrogen) or a vacuum in the reaction vessel. However, it is well known that polymerizable monomers and diluents such as are used in the process of this invention contain trace amounts of impurities such as oxygen. The concentration of molecular oxygen in these materials generally runs in the order of parts per million. Such low concentrations of oxygen have not been found deleterious to the process of this invention. Furthermore, since trialkylborons are oxidized by moist air specifically to esters of dialkylboronous acid, and since the latter compounds are also effective catalysts in accordance with this invention, it is in no way necessary to exclude air when conducting polymerizations with trialkylborons or esters of dialkylboronous acids in aqueous suspensions.

Upon completion of the polymerization, the polymeric product that is formed can be recovered by any convenient method known to those skilled in the art, such as by precipitation, centrifugation, etc. When in solution, the polymer may be precipitated, for example by addition to an alcohol, such as methanol, filtered and dried. Alternatively, when the polymeric product is formed as a solid, e.g. in a non-solvent environment, the product can be centrifuged or simply filtered and dried, the precipitation step being omitted. A polymeric product is thus obtained substantially free from any contaminating residue.

It has also been found that many of the polymers produced by the process of this invention exhibit improved physical properties. For instance, polyethylene prepared by contacting ethylene with the organoboron catalysts of this invention as herein described is substantially crystalline, has a density generally in excess of 0.94 grams per cubic centimeter and manifests a concomitant linearity. In addition, poly(vinyl chloride) produced by the process of this invention at the lower temperatures, such as 10° C. or less, possesses a higher crystallinity and greater heat stability, the latter evidenced, for example, by a higher heat distortion temperature than commercially available poly(vinyl chloride). Moreover, where temperatures of 10° C. or less are employed, the poly(vinyl chloride) products produced by the process of this invention also have stiffness values of the order of 1,400 pounds per square inch at a temperature of 120° C., as compared with poly(vinyl chloride) prepared by standard procedures which manifest stiffness values of about 700 pounds per square inch at a temperature of 120° C. It has also been observed that the poly(vinyl chloride) products prepared by contacting vinyl chloride with the organoboron catalysts of this invention at temperatures of 0° C. and below have second order transition temperatures of from about 85° C. to about 100° C. and above, whereas poly(vinyl chloride) prepared by heretofore known procedures employing azo and peroxy catalyts undergoes a second order transition at 80° C. These higher transition temperatures result in an increased use-temperature for the low temperature poly(vinyl chloride) products of from about 5° C. to about 20° C.

The polymerization of vinyl fluoride is particularly advantageous in accordance with this invention. Poly(vinyl fluoride) products produced by the processes of the prior art have densities of about 1.30 grams per cubic centimeter at a temperature of 25° C., and softening and melting points of below 200° C. In contrast therewith, the process of this invention can produce a substantially linear head to tail polymer structure of poly(vinyl fluoride) having a higher degree of crystallinity than the poly(vinyl fluoride) products of the prior art; a crystalline melting point above 200° C., such as from about 210° C. to about 230° C., or slightly higher; densities of greater than 1.30, such as from about 1.35 to about 1.38 grams per cubic centimeter and higher at a temperature of 25° C.; and softening points of greater than about 200° C. Thus, it can be seen that poly(vinyl fluoride) produced by the process of this invention is superior to the poly(vinyl fluoride) products of the prior art and has greater utility for high temperature application, such as in fiber or film form. Moreover, the process used in accordance with this invention for producing poly(vinyl fluoride) has a number of advantages over the prior art processes in addition to the production of a superior polymer. For instance, by the present invention, vinyl fluoride can be polymerized at the autogenous pressures created in the polymerization reactor, such as about 50 to about 1000 pounds per square inch, instead of the higher pressures, such as 2,000 to 15,000 pounds per square inch, reported in the prior art. Further, by using the organoboron catalysts of this invention, vinyl fluoride can be polymerized at rates as high as about 10 percent conversion of monomer to polymer per hour, whereas under the same conditions of temperature and pressure, the prior art processes give a polymerization rate of about one tenth of a percent conversion per hour.

It has also been found that the molecular weight and the degree of crystallinity of poly(vinyl fluoride) produced by the process of this invention can be regulated by varying the catalyst concentration and/or the amount of diluent used. When large amounts of the organoboron catalysts are used, such as 5 percent by weight based on the charge of the monomer, in the presence of a large amount of diluent, such as about 50 percent of the total volume of reactants and diluent, low molecular weight polymers result, such as those having a reduced viscosity of 0.28 measured as a 1 percent by weight solution in cyclohexanone at a temperature of 118° C. Much higher molecular weight polymers can be prepared by reducing the amount of either the diluent or the catalyst so that the polymerization mixture contains less than about 1.5 percent of catalyst by weight of monomer charged, or less than about 20 percent by weight of diluent based upon monomer charged. Thus, the polymerization in bulk of vinyl fluoride at polymerization temperatures of about 25° C. using very small amounts of tributylboron, for example, from 0.25 percent to 0.5 percent by weight of the monomer charged, has resulted in the production of poly(vinyl fluoride) having a reduced viscosity of 2.2, measured as a 0.2 percent by weight solution in cyclohexanone at a temperature of 140° C. Further, the polymerization of vinyl fluoride without the use of a hydrocarbon diluent has resulted in the production of a polymer having unusually high molecular weight. The higher molecular weight vinyl fluoride polymers also have a higher degree of crystallinity. The effect of polymerization temperature on the molecular weight of the poly(vinyl fluoride) produced by the process of this invention has been very slight in comparison with catalyst and diluent concentrations.

The preferred catalysts for the polymerization of vinyl fluoride are the trialkylboron compounds containing from about 2 to 12 carbon atoms in each alkyl radical of which tributylboron is particularly preferred. The temperature of polymerization can vary broadly in the range from about −80° C. to about 70° C. and is preferably from about −20° C. to about 50° C. The pressure can also be varied broadly. However, it is preferred to conduct the polymerization at the autogenous pressures created in the polymerization reactor.

As herein employed, the term "polymerization" includes within its scope the polymerization of a single monomer and the copolymerization of two or more monomers. Further, the term "polymer," unless otherwise indicated, refers herein to homopolymers and copolymers, i.e. polymers produced from two or more monomers. The second order transition temperature for a resin such as poly(vinyl chloride) is considered to be that temperature at which the stiffness of a molded plaque of the resin about 20 mils in thickness is 10,000 pounds per square inch. The stiffness, determined using an Instron tester, is the secant modulus measured at 1 percent extrusion and at a rate of strain of 10 percent per minute. This stiffness is determined at series of temperatures and a smooth curve drawn through the points. The temperature at which this curve intersects the 10,000 pounds per square inch ordinate line is called the second order transition temperature. The heat distortion temperature values are measured in accordance with ASTM test method DC 48–45T. The term "reduced viscosity" is well known in the polymer art and is obtained by dividing the specific viscosity of a solution of the polymer by the concentration of the polymer in the solution, the concentration being measured in grams of polymer per 100 milliliters of solvent; the specific viscosity is obtained by dividing the difference between the viscosity of the polymeric solution and the viscosity of the pure solvent by the viscosity of the solvent. The reduced viscosity of a polymer is regarded as a measure of the molecular weight of the polymer, with higher values indicating higher molecular weights. The concentration of polymer in solution in determining the reduced viscosities of the polymers produced as described in the examples set forth below was 0.2 gram per 100 milliliters of solvent, unless otherwise indicated. The densities of the polymers of this invention were obtained by the density gradient tube technique. The softening point is determined by the temperature at which the secant tensile modulus of a molded and annealed specimen is less than 1,000 pounds per square inch or, alternatively, when that of an oriented fiber is less than 0.1 gram/denier.

The invention can be illustrated further by the following specific examples of its practice but is not intended to be limited thereto.

EXAMPLE 1

A Pyrex polymerization tube was charged with 20 milliliters of vinyl chloride and 2 milliliters of a methanol solution containing 0.04 gram of tributylboron. The tube was capped and rotated end over end in a water bath maintained at a temperature of 10° C. for a period of 68 hours. After washing the contents of the tube with methanol and drying, 2.5 grams of white powdered poly(vinyl chloride) were obtained. The product had a reduced viscosity in cyclohexanone of 1.27 at a temperature of 30° C.

EXAMPLES 2 AND 3

A mixture of 25 milliliters of vinyl chloride, 150 milliliters of water, 15 milliliters of a 5 percent aqueous solution of dioctyl sodium sulfosuccinate and 0.5 milliliter of tributylboron was charged to each of two bottles under a nitrogen atmosphere. One bottle was rotated end over end in a water bath maintained at a temperature of 10° C. for a period of 24 hours. The product thus formed was then separated by filtration, washed with methanol and air dried, whereupon 10 grams of a white poly(vinyl chloride) product were obtained. The product had a reduced viscosity in cyclohexanone of 2.84 at a temperature of 30° C. The second bottle was heated in a water bath maintained at a temperature of 50° C. for a period of 24 hours. Upon washing the product thus formed with methanol and drying, 9 grams of poly(vinyl chloride) were obtained. This product had a reduced viscosity in cyclohexanone of 1.04 at a temperature of 30° C.

EXAMPLES 4 TO 12

In the following examples, polymerization tubes were charged with 15 milliliters of vinyl chloride, 0.2 milliliter of tributylboron and 15 milliliters of diluent and placed in a bath maintained at a temperature of −4° C. The resulting poly(vinyl chloride) products were then recovered and otherwise treated as described in Example 1. The particular diluent used, the poly(vinyl chloride) product yield in grams and the reduced viscosity of the poly(vinyl chloride) product as determined from a cyclohexanone solution at a temperature of 30° C. are tabulated below for each example in Table A.

Table A

| Example | Diluent | Polymer Yield (g.) | Reduced Viscosity |
|---|---|---|---|
| 4 | Methanol | 1 | 0.67 |
| 5 | Acetone | 2 | 1.11 |
| 6 | Heptane | 11 | 0.82 |
| 7 | Toluene | 3 | 0.59 |
| 8 | Chlorobenzene | 4 | 1.10 |
| 9 | Acetonitrile | 1 | 0.57 |
| 10 | Dimethyl-Formamide | 5 | 0.58 |
| 11 | Ethyl acetate | 3 | 0.98 |
| 12 | Ethylene dichloride | 6 | 1.11 |

EXAMPLE 13

To a 3-liter resin flask fitted with a reflux condenser and stirrer there were charged 2 liters of liquid vinyl chloride which had been initially chilled to a temperature of −80° C. The liquid was allowed to warm, and when the temperature reached −26° C., 3 milliliters of tributylboron were added thereto. The resulting milky liquid was stirred under reflux at a temperature of −14° C. After about three hours, the mixture became too thick to stir. The pasty mass was allowed to stand without agitation for an additional hour under reflux and was then washed with isopropyl alcohol and dried. The white powdery poly(vinyl chloride) product thus obtained weighed 378 grams, had a reduced viscosity in cyclohexanone of 4.18 at a temperature of 30° C. and had a heat distortion temperature of 89° C.

This experiment was repeated using 2.5 milliliters of vinyl chloride and 1.0 milliliter of tributylboron. In 11.5 hours, 129 grams of poly(vinyl chloride) were produced. A portion of this product which was washed with methanol and dried had a reduced viscosity in cyclohexanone of 5.12 at a temperature of 30° C.

EXAMPLE 14

A solution of 50 milliliters of vinyl chloride and 1.0 milliliter of tributylboron in 100 milliliters of heptane was cooled at a temperature of −78° C. for a period of 45 hours, whereupon 5 grams of poly(vinyl chloride) were obtained. The product had a reduced viscosity of 0.59 in cyclohexanone at a temperature of 30° C.

EXAMPLE 15

The procedure of Example 13 was repeated using the same materials described in that example save in that the solution was cooled at a temperature of −20° C. for a period of 20 hours. The yield of poly(vinyl chloride) thus obtained was 30 grams. The polymer had a reduced viscosity of 0.74 and a second order transition temperature of 90° C.

EXAMPLE 16

A polymerization tube was charged with 15 milliliters of vinyl chloride, 15 milliliters of methanol and 0.2 milliliter of di-n-butylboronous anhydride ($Bu_2B$—O—$BBu_2$)* and placed in a bath at a temperature of −4° C. for a period of 19 hours, whereupon 4.5 grams of poly(vinyl chloride) were formed. The product had a reduced viscosity of 2.27 in cyclohexanone at a temperature of 30° C.

EXAMPLE 17

A polymerization tube was charged with 15 milliliters vinyl chloride, 15 milliliters of methanol and 0.2 milliliter of n-butyl di-n-butyl-boronite ($Bu_2BOBu$),* and placed in a bath at a temperature of −4° C. for a period of 16 hours, whereupon 1.0 gram of poly(vinyl chloride) was produced. The product had a reduced viscosity of 1.22 in cyclohexanone at a temperature of 30° C.

EXAMPLE 18

A bottle was charged with 200 milliliters of heptane, 50 milliliters of vinyl chloride and 1.0 milliliter of triethylboron, and heated at a temperature of 15° C. for a period of 7 hours, whereupon 5 grams of poly(vinyl chloride) were obtained. The product had a reduced viscosity of 0.48 in cyclohexanone at a temperature of 30° C.

EXAMPLE 19

To a 1-liter stainless steel bomb there were charged 300 milliliters of methanol and 3.0 grams of tributylboron. After sealing the bomb, ethylene was added until the pressure in the bomb reached a pressure of 850 pounds per square inch gauge at room temperature. The bomb was then heated at a temperature of 100° C. for a period of 12 hours under a pressure of 2750 pounds per square inch gauge. After cooling the bomb and venting the unreacted ethylene, a white solid was found suspended in the methanol. This product was filtered, washed with methanol and dried. The polyethylene product obtained in this manner weighed 5 grams and had a density of 0.951 gram per cubic centimeter.

EXAMPLE 20

To a stainless steel bomb there were charged 500 milliliters of heptane and 3.0 grams of tributylboron. Ethylene was then added until the pressure in the bomb reached 850 pounds per square inch gauge. The bomb was then heated to a temperature of 100° C., whereupon a pressure of 4500 pounds per square inch was developed. The pressure dropped 600 pounds per square inch gauge in four hours. The product thus formed was thereafter recovered as described in Example 19. In this manner, 43 grams of white solid polyethylene were obtained. The product had a density of 0.949 gram per cubic centimeter and evidenced only 5 percent solubility in toluene at room temperature.

In like manner, a series of experiments were conducted in which a series of polymerization tubes were charged with 15 milliliters of diluent, 15 milliliters of monomer and 0.2 milliliter of tributylboron and treated under the operating conditions indicated in Table B, below. The particular monomer and diluent used, the polymer yield in grams and the reduced viscosity of the product at a temperature of 30° C. are also tabulated for each example.

*Table B*

| Example | Monomer | Diluent | Temp. (° C.) | Time (hrs.) | Polymer Yield (g.) | Reduced Viscosity |
|---|---|---|---|---|---|---|
| 21 | Ethyl acrylate | Methanol | −78 | 19 | 13 | a 9.50 |
| 22 | ....do........ | Ether | −4 | 18 | 4.5 | a 0.87 |
| 23 | Vinyl acetate | Heptane | −4 | 18 | 6 | a 0.59 |
| 24 | Methyl methacrylate | ....do.... | −4 | 18 | 2 | a 1.27 |
| 25 | Acrylonitrile | Acetone | −4 | 67 | 1 | b 3.48 |
| 26 | Styrene | Pyridene | 50 | 20 | 2 | a 0.56 |
| 27 | Vinylidene chloride | Toluene | −4 | 20 | 1 | | a Determined from a benzene solution.
b Determined from a dimethylformamide solution.

EXAMPLE 28

A 500-milliliter stainless steel autoclave was charged with 100 milliliters of heptane, 4.0 milliliters of tributylboron and 93 grams of vinyl fluoride. The reactants were charged in the following manner. The heptane solvent and tributylboron catalyst were added under a nitrogen atmosphere in order to prevent oxygen from getting into the bomb. Ninety-three grams of vinyl fluoride were then added from a charging cylinder by cooling the autoclave in an ice bath and warming the charging cylinder containing the monomer. Agitation was achieved by using a Teflon-covered magnetic stirrer inside the autoclave. Cooling during polymerization was accomplished by placing the autoclave in an ice bath maintained at a temperature of +5° C. Autogenous pressure engendered within the autoclave ranged from 85 to 215 pounds per square inch gauge. The reaction was allowed to proceed for a period of about 3 hours. At the end of that time, the unreacted monomer was vented and the contents of the autoclave washed in isopropanol. The finely divided white powdery poly(vinyl fluoride) thus formed was dried at a temperature of 50° C. for a period of 20 hours. The polymer yield was 23.9 grams, representing a 26 percent conversion of monomer to polymer. The reduced viscosity of the product was 0.28 as determined from a 1.0 percent solution of the resin in cyclohexanone at a temperature of between 116° C. and 118° C.

*Bu designates the butyl radical (—$C_4H_9$).

EXAMPLES 29 TO 39

Additional polymerizations of vinyl fluoride, designated as Examples 29–39, were conducted using essentially the same methods for polymerization as that described in Example 28. The operating conditions and the results obtained in each example are tabulated below in Table C.

Table C

| Example | Diluent | | Vinyl Fluoride Weight (g.) | Tributyl-boron (ml.) | Polymerization Temperature (° C.) | Polymer Yield (g.) | Conversion (percent) | Reduced Viscosity |
|---|---|---|---|---|---|---|---|---|
| | Name | Quantity, ml. | | | | | | |
| 29 | Heptane(d) | 10 | 34 | 2.0 | 10± 8 | 1 | | |
| 30 | Isooctane(d) | 100 | 50 | 2.0 | 2 – 19 | 13.0 | 26 | (a) 0.42 |
| 31 | Heptane(d) | 50 | 63 | 0.7 | 26± 4 | 1.2 | | |
| 32 | Isooctane | 50 | 67 | 2.0 | 3 – 24 | 11.5 | 17.2 | |
| 33 | ---do--- | 100 | 49 | 4.0 | –5± 5 | 12 | 24.5 | |
| 34 | ---do--- | 200 | 88 | 4.0 | 20± 7 | 22.3 | 25 | (a) 0.42 |
| 35 | Water / Tergitol NP27(e) / Methocel(f)---(gm.) | 100 / 1.5 / 0.1 | 53 | 2.0 | 20± 3 | 3.5 | 6.6 | (a)(b) 0.25 |
| 36 | Isooctane | 20 | 65 | 1.0 | 25 | 21.8 | 33.5 | (a) 1.01 |
| 37 | ---do--- | 20 | 59 | 0.6 | 25 | 12.4 | 21 | (a) 1.12 |
| 38 | ---do--- | 20 | 56 | 0.5 | 23± 2 | 13.1 | 23.4 | (a) 1.12 |
| 39 | ---do--- | 20 | 138 | (g) 20 | 25± 5 | 34.9 | 25.3 | (c) 0.81 |

(a) Reduced viscosities measured at 1% concentration in cyclohexanone at a temperature of 118° C.
(b) Partially insoluble under conditions given in (a).
(c) Reduced viscosities measured at 0.2% concentration in cyclohexanone at a temperature of 138° C.
(d) No glass liner present in autoclave.
(e) An alkyl phenyl polyethylene glycol ether surface active agent sold by the Union Carbide Chemicals Co.
(f) A methyl cellulose emulsifying agent sold by The Dow chemical Co.
(g) Of a 0.2 molar solution of tributylboron in isooctane.

EXAMPLE 40

This example was performed in a manner similar to that described in Example 39. A 500-milliliter stainless steel autoclave was charged with 10 milliliters of heptane, 4.0 milliliters of tributylboron, 80 grams of vinyl chloride and 58 grams of vinyl fluoride. The temperature within the autoclave was controlled by cooling the autoclave in an ice water bath, and was maintained in the range of from 2° C. to 12° C. Autogenous pressures within the autoclave ranged from 97 to 160 pounds per square inch gauge. The reaction was allowed to proceed for a period of 5 hours, whereupon the unreacted monomer was vented and the polymer thus formed washed with isopropanol. 39 grams of a white powdery vinyl fluoride-vinyl chloride copolymer were obtained after drying at a temperature of 50° C. for a period of 18 hours. The reduced viscosity of the product in cyclohexanone at a temperature of 30° C. was 0.54. Because of the difficulty in separating fluorine and chlorine in conventional analysis, the composition of this copolymer product was obtained by nuclear magnetic resonance. A brief summary of this technique can be found in "Chemical Applications of Spectroscopy," Techniques of Org. Chem., vol. IX, pp. 175 to 179. Application of this technique demonstrated that the copolymer contained 4 percent ±0.5 percent by weight of vinyl fluoride with the remainder being vinyl chloride.

EXAMPLE 41

Into a Pyrex polymerization tube there were charged 15 milliliters of vinyl chloride, 15 milliliters of acrylonitrile and 0.2 milliliter of tributylboron. The tube was capped and rotated end over end for a period of 19 hours, while the temperature of the tube was maintained at −40° C. A polymeric product was formed. Methanol was added to the polymerization tube and the polymer filtered and dried. 2.5 grams of a solid copolymer of vinyl chloride and acrylonitrile were thereby obtained. The copolymer had a reduced viscosity of 5.45 in dimethylformamide at a temperature of 30° C. The chlorine and nitrogen analysis indicated that the copolymer contained 22 percent by weight of vinyl chloride with the remainder being acrylonitrile.

EXAMPLE 42

A 500-milliliter stainless steel autoclave equipped with a glass liner was charged with 20 milliliters of a 0.2 molar solution of tributylboron in isooctane and 138 grams of vinyl fluoride. The autoclave had been previously purged with high purity nitrogen and the charge of monomer and catalyst was introduced without exposure to the atmosphere. The charged autoclave was maintained at a temperature of 30° C. for a period of 18 hours under an autogenous pressure of about 400 pounds per square inch gauge. Thereafter, the unreacted vinyl fluoride was vented and 35 grams of poly(vinyl fluoride) were recovered as finely divided white granules which were then washed with isopropanol and dried at a temperature of 50° C. for a period of 24 hours. The polymer was found to have a reduced viscosity of 0.81 in cyclohexanone at a temperature of 140° C.

EXAMPLE 43

To a 2-liter stainless steel autoclave there were charged 50 milliliters of isooctane, 10 milliliters of a 1.0 molar solution of tributylboron in isooctane and 772 grams of vinyl fluoride. The autoclave and isooctane had been previously purged with high purity nitrogen and the charge of monomer and catalyst introduced without exposure to the atmosphere. The autoclave was maintained at a temperature in the range of from 15° C. to 35° C. for a period of about 17 hours. Thereafter, the unreacted monomer was vented and the poly(vinyl fluoride) product thus formed was then recovered, washed with isopropanol and dried for 24 hours in a 50° C. oven. The polymer was obtained in a 204-gram yield and found to have a reduced viscosity of 2.88 in cyclohexanone at a temperature of 140° C. For further evaluation, a 176-gram sample of the poly(vinyl fluoride) product was dispersed in 2 liters of methanol containing 4.0 milliliters dicyclohexylamine. The suspension was stirred for 15 minutes and then filtered. Titration of the filtrate revealed that the amount of amine remaining adsorbed on the polymer was 0.2 percent by weight of the polymer. Further, when molded at a temperature of 240° C. for a period of 2 minutes at a pressure of 40,000 pounds per square inch, the polymer sample was found to have a density of 1.381 grams per cubic centimeter. The birefringence melting point of the polymer sample when oriented was found to be between 227° C. and 230° C. The stiffness modulus-temperature relation for the polymer sample may be abbreviated by letting $T_i$ represent that temperature at which the logarithm of the stiffness modulus is given by the subscript $i$. Accordingly, the following temperatures describe the stiffness temperature relation of the poly(vinyl fluoride) sample:

$T_5$ ---------- 50
$T_4$ ---------- 157
$T_3$ ---------- 209
$T_2$ ---------- 227

The melting point derived from this relation can be estimated as between 228° C. and 230° C. and is in agreement with the birefringence melting point. Strips of the molded plaques produced from the polymer sample were both hot drawn and cold drawn. The cold drawn sample exhibited a tensile strength of 5,503 pounds per square inch before breaking.

EXAMPLE 44

In the same manner as described in Example 43, there were charged to a stainless steel autoclave 130 milliliters of isooctane, 10 milliliters of 1.0 molar solution of tributylboron in isooctane and 626 grams of vinyl fluoride. The reaction temperature was maintained in the range of from 19° C. to 27° C. for a period of about 17 hours. At the end of that time, 135 grams of poly(vinyl fluoride) were recovered. The product had a reduced viscosity in cyclohexanone of 1.21 at a temperature of between 138° C. and 140° C. A sample of the polymer was stabilized with dicyclohexylamine as described in Example 43. The polymer sample was molded at a temperature of 200° C. at a pressure of 40,000 pounds per square inch for a period of 2 minutes. The density of the molded sample was 1.381 grams per cubic centimeter. The stiffness modulus-temperature relation of the poly(vinyl fluoride) sample is given as follows:

$T_5$ ---------------------------------------- 52
$T_4$ ---------------------------------------- 160
$T_3$ ---------------------------------------- 205
$T_2$ ---------------------------------------- 218

The birefringence melting point was determined to be about 224° C., and compared favorably with an approximate value of 220° C. estimated from the stiffness temperature relation as indicated above. The room temperature stiffness modulus of the polymer sample was 179,398 pounds per square inch, and the tensile strength measured as 5,328 pounds per square inch. When thin strips of the molded plaque produced from the polymer sample were cold drawn at room temperature, the percent elongation was found to be in the range of from 440 to 550 percent.

EXAMPLES 45 TO 49

The following examples were performed by charging a 500-milliliter stainless steel autoclave with 2.5 milliliters of a 1.0 molar solution of tributylboron in isooctane, various amounts of vinyl fluoride monomer and, in some of the examples, additional isooctane diluent. Precautions were taken to prevent oxygen from getting into polymerization system. For this reason, the autoclave was purged with nitrogen and the ingredients were charged under a nitrogen atmosphere. Agitation was achieved by using a magnetic stirrer. Autogenous pressure ranged from about 85 to about 215 pounds per square inch gauge. The polymerization reactions were allowed to proceed for a period of about 3 hours. At the end of that time, the unreacted monomer was vented and the contents of the autoclave washed with isopropanol. The finely divided white powdery poly(vinyl fluoride) products thus obtained were then dried at a temperature of 50° C. for a period of 20 hours. The polymerization data and the reduced viscosities of the polymers obtained in each of the examples are tabulated below in Table D. The reduced viscosities were measured at a temperature of between 139° C. and 140° C. from a cyclohexanone solution of the polymers.

*Table D*

| Example | Additional Diluent (ml.) | Monomer Weight (g.) | Reaction Temperature (° C.) | Polymer Yield (g.) | Reduced Viscosity |
|---|---|---|---|---|---|
| 45 | None | 170 | 25±3 | 60 | 1.98 |
| 46 | None | 239 | 25±10 | 64 | 4.01 |
| 47 | 100 | 140 | 25±5 | 31 | 0.82 |
| 48 | 50 | 200 | 20±5 | 24 | 1.04 |
| 49 | 50 | 180 | 25±5 | 37 | 1.37 |

EXAMPLE 50

A 2-liter glass-lined autoclave equipped with a stirrer and inlet and outlet ports was charged with 708 milliliters of distilled water and flushed with nitrogen. The autoclave was then charged with 8.0 milliliters of a 5 percent by weight solution of dioctyl sodium sulfosuccinate and 3.8 milliliters of tributylboron, sealed and stirring begun. Thereafter, 373 grams of vinyl chloride and subsequently 26 grams of ethylene were also added to the autoclave. The ethylene was added to the autoclave while the temperature in the autoclave was maintained in the range of from about 20° C. to about 40° C. After a period of about 67 hours had elapsed, the autoclave was opened and the polymeric product thus formed filtered, washed with hot water and then with methanol and finally dried overnight at a temperature of about 50° C. In this manner, 3 grams of a copolymer of vinyl chloride and ethylene containing about 2 percent by weight of ethylene copolymerized therein and having a reduced viscosity of 1.15 in cyclohexanone at a temperature of 30° C. were obtained.

This application is a continuation in part of copending application Serial No. 802,313, filed March 27, 1959 which, in turn, is a continuation-in-part of application, Serial No. 658,245, filed May 10, 1957, now abandoned.

What is claimed is:

1. A process for the polymerization of ethylenically unsaturated monomers having the general formula:

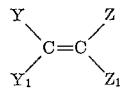

wherein Y and $Y_1$ each designates a member selected from the group consisting of hydrogen and halogen atoms, Z designates a member of the group consisting of hydrogen atoms, halogen atoms and the alkyl radicals, containing from 1 to about 4 carbon atoms, $Z_1$ designates a substituent having a Hammett para-sigma value of from zero to a positive value, and wherein when Z designates an alkyl radical, $Z_1$ designates a substituent having a positive para-sigma value of at least about 0.4, which process comprises contacting said ethylenically unsaturated monomer with a catalytic quantity, sufficient to polymerize said ethylenically unsaturated monomer, of a catalyst consisting of an organoboron compound having the general formula:

wherein X designates a member selected from the group consisting of —$R_2$, —$OR_2$, and

radicals and R, $R_1$, $R_2$ and $R_3$ each designates a monovalent hydrocarbon radical containing from 1 to about 12 carbon atoms.

2. A process for the polymerization of ethylenically unsaturated monomers having the general formula:

wherein Y and $Y_1$ each designates a member selected from the group consisting of hydrogen and halogen atoms, Z designates a member of the group consisting of hydrogen atoms, halogen atoms and the alkyl radicals containing from 1 to about 4 carbon atoms, $Z_1$ designates a substitutent having a para-sigma value of from zero to a positive value, and wherein when S designates an alkyl radical, $Z_1$ designates a substituent having a positive Hammett para-sigma value of at least about 0.4, which process comprises contacting said ethylenically unsaturated monomer at a temperature of from about −120° C. to about 250° C. with a catalytic quantity, sufficient to polymerize said ethylenically unsaturated monomer, of a catalyst consisting of an organoboron compound having the general formula:

wherein X designates a member selected from the group consisting of —$R_2$, —$OR_2$ and

radicals and R, $R_1$, $R_2$ and $R_3$ each designates an alkyl radical containing from 2 to about 12 carbon atoms.

3. The process of claim 2 wherein the organoboron compound is tri-n-butylboron.

4. The process of claim 2 wherein the organoboron compound is di-n-butylboronus anhydride.

5. The process of claim 2 wherein the organoboron compound is n-butyl di-n-butylboronite.

6. The process of claim 2 wherein the organoboron compound is triethylboron.

7. A process for the production of poly(vinyl chloride) which comprises contacting vinyl chloride at a temperature of from about −80° C. to about 70° C. with from about 0.03 percent to about 5 percent by weight based upon said vinyl chloride of a catalyst consisting of an organoboron compound having the general formula:

wherein X designates a member selected from the group consisting of —$R_2$, —$OR_2$ and

radicals and R, $R_1$, $R_2$ and $R_3$ each designates an alkyl radical containing from 2 to about 12 carbon atoms.

8. The process of claim 7 wherein the organoboron compound is tri-n-butylboron.

9. A process for the production of poly(vinyl fluoride) which comprises contacting vinyl fluoride at a temperature of from about −80° C. to about 70° C. with from about 0.03 percent to about 5 percent by weight based upon said vinyl fluoride of a catalyst consisting of an organoboron compound having the general formula:

wherein X designates a member selected from the group consisting of —$R_2$, —$OR_2$ and

radicals and R, $R_1$, $R_2$ and $R_3$ each designates an alkyl radical containing from 2 to about 12 carbon atoms.

10. The process of claim 9 wherein the organoboron compound is tri-n-butylboron.

11. A process for the production of poly(vinyl acetate) which comprises contacting vinyl acetate at a temperature of from about −80° C. to about 70° C. with from about 0.03 percent to about 5 percent by weight based upon said vinyl acetate of a catalyst consisting of an organoboron compound having the general formula:

wherein X designates a member selected from the group consisting of —$R_2$, —$OR_2$ and

radicals and R, $R_1$, $R_2$ and $R_3$ each designates an alkyl radical containing from 2 to about 12 carbon atoms.

12. The process of claim 11 wherein the organoboron compound is tri-n-butylboron.

13. A process for the production of polyethylene which comprises contacting ethylene at a temperature of from about 0° C. to about 250° C. with from about 0.03 percent to about 5 percent by weight based upon said ethylene of a catalyst consisting of an organoboron compound having the general formula:

wherein X is a member selected from the group consisting of —$R_2$, —$OR_2$ and

radicals and R, $R_1$, $R_2$ and $R_3$ each designates an alkyl radical containing from 2 to about 12 carbon atoms.

14. The process of claim 13 wherein the organoboron compound is tri-n-butylboron.

15. A process for the production of polystyrene which comprises contacting styrene at a temperature of from about −10° C. to about 100° C. with from about 0.03 percent to about 5 percent by weight based upon said styrene of an organoboron compound having the general formula:

wherein X designates a member selected from the group consisting of —$R_2$, —$OR_2$ and

radicals and R, $R_1$, $R_2$ and $R_3$ each designates an alkyl radical containing from 2 to about 12 carbon atoms.

16. The process of claim 15 wherein the organoboron compound is tri-n-butylboron.

17. A substantially linear and highly crystalline poly(vinyl fluoride) having a crystalline melting point above 210° C. and a density at a temperature of 25° C. of about 1.38 grams per cubic centimeter.

References Cited in the file of this patent

UNITED STATES PATENTS

| | | |
|---|---|---|
| 2,840,551 | Field | June 24, 1958 |
| 2,985,633 | Welch | May 23, 1961 |

OTHER REFERENCES

Fordham et al.: J. Polymer Sci., XXXIII, 503–504 (1958).

Furukawa et al.: Journal Polymer Science, vol. 26, No. 113, pages 234–6 (1957).

Kolesnikov et al.: Invest. Akad. Nauk S.S.S.R., Otdel Khim Nauk, page 652 (1957).